United States Patent Office 3,808,235
Patented Apr. 30, 1974

3,808,235
ALKYL β-(N'-2-TETRAHYDROPYRANYLUREIDO) ACRYLATES
Daniel Bertin, Jacques Perronnet, and Andre Teche, Paris, France, assignors to Roussel-UCLAF, Paris, France
No Drawing. Original application Mar. 22, 1971, Ser. No. 126,865, now Patent No. 3,732,228. Divided and this application Sept. 21, 1972, Ser. No. 290,965
Int. Cl. C07d 7/04
U.S. Cl. 260—345.8         6 Claims Novel 1,2,3,4-tetrahydropyrimidine-2,4-diones of the formula

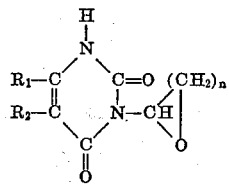

(I)

wherein $R_1$ is selected from the group consisting of lower alkyl of 1 to 7 carbon atoms and phenyl, $R_2$ is selected from the group consisting of hydrogen, chlorine, bromine and lower alkyl of 1 to 7 carbon atoms and $n$ is 3 or 4 which have herbicidal activity and their preparation and intermediates therefor.

PRIOR APPLICATION

This application is a division of our copending, commonly assigned U.S. patent application, Ser. No. 126,865, filed Mar. 22, 1971, now U.S. Pat. No. 3,732,228.

STATE OF THE ART

Certain tetrahydropyrimidines are known to possess herbicidal activity. For example, 3-sec.butyl-5-bromo-6-methyl-1,2,3,4-tetrahydropyrimidine-2,4-dione, sold under the name bromacile, is used for eradicating weeds in orchards of adult peach trees. Unfortunately, these compounds cannot be generally used except as total herbicides as their activity is not selective.

OBJECTS OF THE INVENTION

It is an object of the invention to provide the novel 1,2,3,4-tetrahydropyrimidine-2,4-diones of Formula I.

It is another object of the invention to provide a novel process for the preparation of the compounds of Formula I and to provide the novel intermediates formed in said process.

It is an object of the invention to provide novel herbicidal compositions and to provide a novel method of killing undesired plants.

These and other objects and advantages of the invention will become obvious from the following detailed description.

THE INVENTION

The novel 1,2,3,4-tetrahydropyropyrimidine-2,4-diones of the invention have the formula

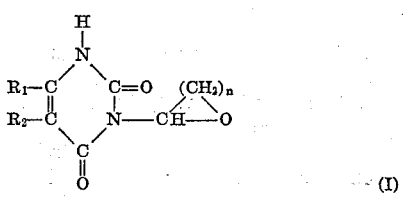

(I)

wherein $R_1$ is selected from the group consisting of lower alkyl of 1 to 7 carbon atoms and phenyl, $R_2$ is selected from the group consisting of hydrogen, chlorine, bromine and lower alkyl of 1 to 7 carbon atoms and $n$ is 3 or 4.

Examples of suitable compounds of Formula I are 3-(2'-tetrahydropyranyl)-5-chloro-6-methyl-1,2,3,4-tetrahydropyrimidine-2,4-dione,
3-(2'-tetrahydrofuranyl)-5-chloro-6-methyl-1,2,3,4-tetrahydropyrimidine-2,4-dione,
3-(2'-tetrahydropyranyl)-6-methyl-1,2,3,4-tetrahydropyrimidine-2,4-dione,
3-(2'-tetrahydropyranyl)-5-bromo-6-methyl-1,2,3,4-tetrahydropyrimidine-2,4-dione,
3-(2'-tetrahydrofuranyl)-6-methyl-1,2,3,4-tetrahydropyrimidine-2,4-dione,
3-(2'-tetrahydrofuranyl)-5-bromo-6-methyl-1,2,3,4-tetrahydropyrimidine-2,4-dione,
3-(2'-tetrahydropyranyl)-6-phenyl-1,2,3,4-tetrahydropyrimidine-2,4-dione,
3-(2'-tetrahydropyranyl)-5-chloro-6-phenyl-1,2,3,4-tetrahydropyrimidine-2,4-dione,
3-(2'-tetrahydropyranyl)-5,6-dimethyl-1,2,3,4-tetrahydropyrimidine-2,4-dione, and
3-(2'-tetrahydropyranyl)-5-bromo-6-phenyl-1,2,3,4-tetrahydropyrimidine-2,4-dione.

The novel process of the invention for the preparation of the tetrahydropyrimidines of Formula I comprises condensing an alkyl β-amino-acrylate of the formula

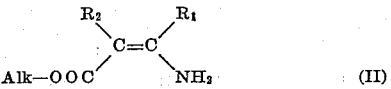

(II)

wherein $R_1$ and $R_2$ have the above definitions and Alk is lower alkyl of 1 to 7 carbon atoms with an isocyanate selected from the group consisting of 2-tetrahydropyranyl isocyanate and 2-tetrahydrofuranyl isocyanate in the presence of a basic agent to form an alkyl β-(N'-2-tetrahydroheterocyclic ureido)-acrylate of the formula

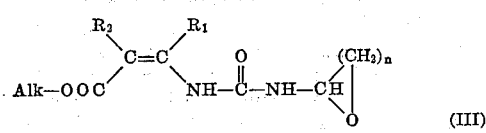

(III)

wherein $R_1$, $R_2$, Alk and $n$ have the above definitions and cyclizing the latter in the presence of a basic agent to form the corresponding compound of Formula I.

Preferably the basic condensation agent is a tertiary amine such as trimethylamine, triethylamine, pyridine, N-methyl-piperidine, N-methyl-pyrrolidine or quinoline. The basic cyclization agent is preferably an alkali metal lower alcoholate such as sodium methylate or sodium ethylate. The cyclization is preferably effected in an organic solvent such as an alcohol, e.g. ethanol.

The starting alkyl β-amino acrylates of Formula II can be prepared from a compound of the formula

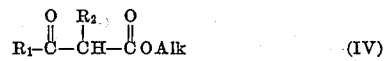

(IV)

wherein $R_1$, $R_2$ and Alk have the above definitions by a process analogous to that described by Genvresse (Ann. de Chim., vol. 24, p. 64). 2-tetrahydropyranyl isocyanate may be prepared by the process described in French Pat. No. 1,425,137 and 2-tetrahydrofuranyl isocyanate may be prepared by reacting 2-chloro-tetrahydrofuran with acetonitrile.

The process of the invention comprises 2 stages, the condensation and the cyclization. The intermediate resulting from the condensation step may be recovered and purified and then cyclized or the cyclization may be effected in the reaction mixture resulting from the condensation.

In a variation of the process of the invention, the compounds of Formula III may be prepared by condensing in the presence of a dehydration agent an alkyl β-ureido-acrylate of the formula

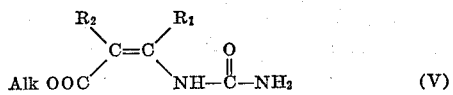 (V)

wherein $R_1$, $R_2$ and Alk have the above definitions with dihydropyran or dihydrofuran to obtain the corresponding compound of Formula III. The preferred dehydration agent is p-toluenesulfonic acid and the reaction is effected in the presence of an organic solvent such as benzene, toluene, xylene or tetrahydrofuran. The compound of Formula V can be prepared by condensing urea with a compound of Formula IV.

To obtain a compound of Formula I wherein $R_2$ is chlorine or bromine, the corresponding compound of Formula I where $R_2$ is hydrogen is reacted with a halogenation agent. Suitable halogenation agents are sulfuryl chloride where $R_2$ is to be chlorine and bromine or N-bromo-succinimide when $R_2$ is to be bromine.

The compounds of Formula I present little or no phytotoxic activity against certain valuable plants such as cotton and can therefore be used to kill parasitic weeds in fields of the useful plants. The said compounds have pre- and post-emergence herbicidal activity as can be seen from tests against large botanical families such as foxtail grass, chrysanthemum, flax, mustard, oats, wheat, corn, clover and beets.

The novel herbicidal compositions of the invention are comprised of at least one compound of Formula I and an inert carrier. The compositions may be in the form of powders, granules and suspensions, emulsions or solutions containing the active ingredients, for example a mixture with a vehicle and/or an anionic, cationic or non-ionic surface active agent to insure a uniform dispersion of the substances in the composition. The vehicle may be a liquid such as water, alcohol, hydrocarbons or other organic solvents, a mineral, animal or vegetable oil or a powder such as talc, kieselguhr, silicates or clay.

The solid compositions in the form of a dusting powder, wettable powder or granules may be prepared by grinding the active compound with an inert solid or by impregnation of a solid support with a solution of the active ingredient in a solvent and evaporating the solvent. The compositions may contain other active agents such as other pesticides, herbicides, and/or fungicides, biocides, insecticides, etc., and other compounds influencing the growth of the plants.

The novel process of killing weeds comprises contacting weeds with a herbicidal amount of at least one compound of Formula I either before or after emergence of the weeds. The usual useful amount of the active compound is 0.2 to 40 kg./ha. and preferably 0.6 to 5.0 kg./ha. The exact amount will vary as a function of treated vegetation, the nature of terrain, atmospheric conditions and state of growth.

In the following examples here are described several preferred embodiments to illustrate the invention. However, it should be understood that the invention is not intended to be limited to the specific embodiments.

EXAMPLE I

Preparation of 3-(2'-tetrahydropyranyl)-5,6-dimethyl-1,2,3,4-tetrahydropyramidine-2,4-dione A mixture of 42.9 g. of ethyl 2-methyl-3-amino-crotonate in 600 cc. of toluene, 52.5 g. of 2-tetrahydropyranyl isocyanate and 42 cc. of triethylamine was refluxed for 17 hours and was then cooled to 20° C. The mixture was introduced in to a solution of 60 g. of sodium methylate in 300 cc. of ethanol and the mixture was progressively heated to reflux and held there for 30 minutes. After cooling to 20° C., 300 cc. of water were added thereto and the organic phase was decanted off. The aqueous phase was extracted with ether and then the pH was adjusted to 4 by by the addition of acetic acid. The precipitate formed was recovered by vacuum filtration and was recrystallized from ethanol to obtain 23 g. of 3-(2'-tetrahydropyranyl)-5,6-dimethyl-1,2,3,4-tetrahydro-pyrimidine-2,4-dione melting at 218° C.

Analysis. — $C_{11}H_{16}N_2O_3$: molecular weight=224.26. Calculated (percent): C, 58.9; H, 7.19; N, 12.50. Found (percent): C, 58.8; H, 7.2; N, 12.60.

As far as is known, this compound is not described in the literature.

EXAMPLE II

Using the procedure of Example I, ethyl 2-chloro-3-amino-crotonate and 2-tetrahydrofuranyl-isocyanate were reacted to form 3-(2'-tetrahydrofuranyl)-5-chloro-6-methyl-1,2,3,4-tetrahydropyrimidine-2,4-dione melting at 200° C.

As far as is known, this compound is not described in the literature.

The 2-tetrahydrofuranyl-isocyanate is prepared as follows:

A mixture of 75 g. of 2-chloro-tetrahydrofuran [prepared by method of Normant, C. R., vol. 228 (1949), p. 102], 150 cc. of anhydrous acetonitrile, 150 cc. of anhydrous benzene and 70 g. of sodium cyanate was held at a temperature of 35–38° C. for 2½ hours and then was refluxed for 10 minutes and then was cooled. The insoluble precipitate was removed by vacuum filtration and the solvents were evaporated off under reduced pressure and rectification gave 40 g. of 2-tetrahydrofuranyl isocyanate having a melting point of 60° C. at 35 mm. Hg.

As far as is known, this compound is not described in the literature.

EXAMPLE III

Preparation of 3-(2'-tetrahydropyranyl)-6-methyl-1,2,3,4-tetrahydropyrimidine-2,4-dione A mixture of 30 g. of ethyl 3-amino-crotonate, 75 cc. of anhydrous toluene, 15 g. of triethylamine and 30 g. of 2-tetrahydropyranyl isocyanate was refluxed under a nitrogen atmosphere for two hours and the resulting solution was cooled to room temperature and then was added to 150 cc. of ethanol and 30 g. of sodium methylate. The reaction mixture was refluxed for one hour and the solution was then concentrated to about 100 cc. After addition to water, the mixture was washed with methylene chloride. The resulting aqueous phase was concentrated, acidified to a pH of 2 by the addition of hydrochloric acid and was then vacuum filtered to obtain 26 g. of 3-(2'-tetrahydropyranyl)-6-methyl-1,2,3,4-tetrahydropyrimidine-2,4-dione melting at 224° C.

As far as is known, this compound is not described in the literature.

EXAMPLE IV

Preparation of 3-(2'-tetrahydropyranyl)-5-chloro-6-methyl-1,2,3,4-tetrahydropyrimidine-2,4-dione Step A.—Ethyl α-chloro-β-ureido-crotonate: A mixture of 150 g. of ethyl α-chloro-acetylacetate [prepared by method of Allihn, Ber., vol. 11 (1878), p. 567], 60 g. of urea and a few cc. of pure hydrochloric acid was heated with agitation at 50–55° C. for 16 hours at a pressure of 80 mm. Hg. After cooling the reaction mixture, the precipitate was recovered by vacuum filtration and washed with ether and then water to obtain 37 g. of ethyl α-chloro-β-ureido crotonate melting at 181° C.

As far as is known, this compound is not described in the literature.

Step B.—Ethyl β-(N'-2-tetrahydropyranyl-ureido)-α-chlorocrotonate: A mixture of 25 g. of ethyl α-chloro-β-ureido-crotonate, 12.5 g. of dihydropyran and 2 g. of p-toluenesulfonic acid in 650 cc. of tetrahydrofuran was refluxed with agitation for 4 hours and after cooling, 500 cc. of ethyl acetate were added thereto. The mixture was washed with water, dried over magnesium sulfate and then evaporated to dryness under reduced pressure. The oily residue was crystallized from isopropyl ether to obtain 10 g. of ethyl β-(N'-2-tetrahydropyranyl-ureido)-α-chlorocrotonate melting at 107° C.

As far as is known, this compound is not described in the literature.

Step C.—3 - (2'-tetrahydropyranyl)-5-chloro-6-methyl-1,2,3,4-tetrahydropyrimidine-2,4-dione: 25 g. of ethyl β-(N' - 2-tetrahydropyranyl-ureido)-α-chlorocrotonate were added all at once to a solution of 25 g. of sodium methylate in 250 cc. of ethanol and the mixture was refluxed for 30 minutes and was then evaporated to dryness under reduced pressure. The oil formed was dissolved in water and the solution was acidified by the addition of pure hydrochloric acid. The precipitate formed was recovered by vacuum filtration to obtain 15 g. of 3-(2'-tetrahydropyranyl)-5-chloro-6-methyl - 1,2,3,4 - tetrahydropyrimidine-2,4-dione melting at 225° C. A sample of the product after crystallization from ethyl acetate was analyzed as follows:

Analysis.—$C_{10}H_{13}ClN_2O_3$: molecular weight=244.68. Calculated (percent): C, 49.08; H, 5.36; Cl, 14.49; N, 11.45. Found (percent): C, 49.2; H, 5.20; Cl, 14.7; N, 11.3.

As far as is known, this compound is not described in the literature.

EXAMPLE V 3-(2'-tetrahydropyranyl)-5-chloro-6-methyl-1,2,3,4-tetrahydropyrimidine-2,4-dione 1.4 cc. of sulfuryl chloride was added dropwise to a solution of 3.5 g. of 3-(2'-tetrahydropyranyl)-6-methyl-1,2,3,4-tetrahydropyrimidine-2,4-dione (of Example III) in 20 cc. of chloroform cooled to 0° C. and after stirring for 30 minutes at 0° C., 20 cc. of chloroform were added thereto followed by sufficient aqueous potassium carbonate solution to adjust the pH to 11. The mixture was extracted with water and the aqueous phase was acidified. The precipitate formed was recovered by vacuum filtration to obtain 2 g. of 3-(2'-tetrahydropyranyl)-5-chloro-6 - methyl-1,2,3,4-tetrahydropyrimidine-2,4-dione identical to that produced in Step C of Example IV.

EXAMPLE VI

Preparation of 3-(2'-tetrahydropyranyl)-5-bromo-6-methyl-1,2,3,4-tetrahydropyrimidine-2,4-dione 24 g. of 3-(2'-tetrahydropyranyl) - 6 - methyl-1,2,3,4-tetrahydropyrimidine-2,4-dione were added to a solution containing 25 g. of N-bromosuccinimide and 250 cc. of carbon tetrachloride and the solution was refluxed for 90 minutes. After cooling to room temperature, 250 cc. of methylene chloride were added to the mixture which was then washed with water, dried over sodium sulfate, filtered and evaporated to dryness under reduced pressure. The residue was crystallized from ethanol to obtain 16 g. of 3-(2'-tetrahydropyranyl)-5-bromo-6-methyl-1,2,3,4-tetrahydropyrimidine-2,4-dione melting at 210° C.

Analysis.—$C_{10}H_{13}BrN_2O_3$: molecular weight=289.14. Calculated (percent): C, 41.54; H, 4.53; Br, 27.64; N, 9.69. Found (percent): C, 41.9; H, 4.8; Br, 27.9; N, 9.6.

As far as is known, this compound is not described in the literature.

EXAMPLE VII

Preparation of 3-(2'-tetrahydrofuranyl)-5-bromo-6-methyl-1,2,3,4-tetrahydropyrimidine-2,4-dione Step A.—3-(2'-tetrahydrofuranyl) - 6 - methyl-1,2,3,4-tetrahydropyrimidine-2,4-dione: 46 g. of 2-tetrahydrofuranyl isocyanate were added under nitrogen to a solution containing 46 g. of ethyl 3-amino-crotonate, 12.8 g. of triethylamine and 90 cc. of anhydrous toluene and the mixture was refluxed for 90 minutes and then was cooled to room temperature. 35.5 g. of sodium methylate and 180 cc. of ethanol were added to the reaction mixture and the resulting solution was refluxed for 1 hour and then evaporated to dryness under reduced pressure. The yellow oil residue was dissolved in 200 cc. of water and the solution was washed with 40 cc. of methylene chloride and evaporated to dryness under reduced pressure. The residue was dissolved in 100 cc. of water and the solution was made slightly acidic by addition of concentrated hydrochloric acid. The resulting precipitate was recovered by vacuum filtration and was dissolved in methylene chloride. The organic solution was dried over sodium sulfate, filtered and evaporated to dryness under reduced pressure. The residue was empasted with ethyl ether to obtain 25 g. of 3-(2'-tetrahydrofuranyl)-6-methyl-1,2,3,4-tetrahydropyrimidine-2,4-dione melting at 202° C.

Analysis.—$C_9H_{12}N_2O_3$: molecular weight=196.19. Calculated (percent): C, 55.09; H, 6.17; N, 14.28. Found (percent): C, 55.1; H, 6.3; N, 14.3.

As far as is known, this compound is not described in the literature.

Step B.—3-(2'-tetrahydrofuranyl)-5-bromo - 6 - methyl-1,2,3,4-tetrahydropyrimidine-2,4-dione: 28 g. of N-bromosuccinimide were added to a suspension containing 31 g. of 3-(2'-tetrahydrofuranyl)-6-methyl-1,2,3,4-tetrahydropyrimidine-2,4-dione and 300 cc. of carbon tetrachloride. The resulting suspension was refluxed with agitation for 1 hour and then cooled to room temperature. 600 cc. of methylene chloride were added to the reaction mixture which was then washed twice with 300 cc. of water, dried over sodium sulfate, filtered and evaporated to dryness under reduced pressure. The resulting white crystalline product was crystallized from ethanol to obtain 24 g. of 3-(2' - tetrahydrofuranyl) - 5 - bromo - 6 - methyl-1,2,3,4-tetrahydropyrimidine-2,4-dione melting at 185° C.

Analysis.—$C_9H_{11}BrN_2O_3$: molecular weight=275.08. Calculated (percent): C, 39.30; H, 4.03; N, 10.19; Br, 29.05. Found (percent): C, 39.7; H, 4.1; N, 9.8; Br, 29.1.

As far as is known this compound is not described in the literature.

EXAMPLE VIII 0.57 cc. of sulfuryl chloride were added to a solution of 1.2 g. of 3-(2'-tetrahydrofuranyl)-6-methyl-1,2,3,4-tetrahydropyrimidine-2,4-dione in 20 cc. of chloroform and the mixture was stirred for one hour at 0° C. The resulting suspension was made basic by the addition of caustic potash and 20 cc. of water were added thereto. The solution was decanted and the aqueous phase was made acidic by addition of concentrated hydrochloric acid. The white precipitate was recovered by vacuum filtration and then was dissolved in chloroform. The solution was dried over sodium sulfate, filtered and evaporated to dryness under reduced pressure to obtain 1 g. of white product which was crystallized from ethanol to obtain 0.5 g. of 3-(2'-tetrahydrofuranyl) - 5 - chloro - 6 - methyl - 1,2,3,4-tetrahydropyrimidine-2,4-dione melting at 200° C. The product was identical to that of Example II.

Analysis.—$C_9H_{11}ClN_2O_3$: molecular weight=230.63. Calculated (percent): C, 46.86; H, 4.81; N, 12.15; Cl, 15.38. Found (percent): C, 46.6; H, 4.8; N, 12.5; Cl, 15.1.

EXAMPLE IX

Preparation of 3-(2'-tetrahydropyranyl)-6-phenyl-1,2,3,4-tetrahydropyrimidine-2,4-dione Step A.—Ethyl β-(N'-2-tetrahydropyranyl-ureido)-acrylate: 71 g. of ethyl β-phenyl-β-amino-acrylate (prepared by method of Lukes et al., C. A., vol. 54 (1960), p. 11984e) and 3 cc. of triethylamine were added to 200 cc. of toluene, and then 66.9 g. of 2'-tetrahydropyranyl isocyanate and 100 cc. of anhydrous toluene were added to the reaction mixture. The mixture was refluxed for 12 hours and the toluene was distilled off under reduced pressure. The yellow oil residue was taken up in 100 cc. of absolute ethanol to obtain 216.5 g. of an alcoholic solution of ethyl β-(N'-2-tetrahydropyranyl-ureido)-acrylate.

As far as is known, this compound is not described in the literature.

Step B.—3-(2'-tetrahydropyranyl) - 6 - phenyl-1,2,3,4-tetrahydropyrimidine-2,4-dione: A mixture of 144 g. of the alcoholic solution of Step A and 15 g. of sodium ethylate in 150 cc. of absolute ethanol was refluxed for 12 hours and then evaporated to dryness under reduced pressure. The solid residue was taken up in 250 cc. of ether and the solution was filtered and the solid was washed twice with 50 cc. of ether. The solid obtained was dissolved in 1 liter of water and the solution was adjusted to a pH of 4 by addition of concentrated hydrochloric acid. The precipitate was recovered by vacuum filtration and was empasted 3 times with isopropyl ether and vacuum filtered to obtain a white product. The said product was crystallized from 18 volumes of isopropanol to obtain 17 g. of 3-(2'-tetrahydropyranyl)-6-phenyl-1,2,3,4-tetrahydropyrimidine-2,4-dione melting at 235° C.

*Analysis.*—$C_{15}H_{16}N_2O_3$: molecular weight=272.30. Calculated (percent): C, 66.15; H, 5.92; N, 10.25. Found (percent): C, 66; H, 6.1; N, 9.9.

As far as is known, this compound is not described in the literature.

EXAMPLE X 3-(2'-tetrahydropyranyl)-5-chloro-6-phenyl-1,2,3,4-tetrahydropyrimidine-2,4-dione 2.7 g. of 3-(2'-tetrahydropyranyl)-6-phenyl-1,2,3,4-tetrahydropyrimidine-2,4-dione of Example IX were added to 30 cc. of chloroform and then 1.3 cc. of sulfuryl chloride and 20 cc. of chloroform were added to the mixture at 0° C. The reaction mixture was stirred at 0° C. for 45 minutes, and the resulting solution was added to an aqueous sodium carbonate solution. The decanted chloroform solution was washed with 100 cc. of water, was dried over sodium sulfate, filtered and evaporated to dryness under reduced pressure. The residue was taken up in isopropyl ether and the product obtained by filtration thereof was crystallized from isopropyl alcohol and then from ethyl acetate to obtain 1.1 g. of 3-(2'-tetrahydropyranyl)-5-chloro - 6 - phenyl-1,2,3,4-tetrahydropyrimidine-2,4-dione melting at 194–196° C.

*Analysis.*—$C_{15}H_{15}ClN_2O_3$: molecular weight=306.751. Calculated (percent): C, 58.73; H, 4.13; Cl, 11.56; N, 9.13. Found (percent): C, 58.8; H, 5.1; Cl, 11.4; N, 8.8.

As far as is known, this compound is not described in the literature.

EXAMPLE XI

Preparation of 3-(2'-tetrahydropyranyl)-5-bromo-6-phenyl-1,2,3,4-tetrahydropyrimidine-2,4-dione A mixture of 1.75 g. of N-bromosuccinimide and 2.7 g. of 3 - (2'-tetrahydropyranyl)-6-phenyl-1,2,3,4-tetrahydropyrimidine-2,4-dione in 100 cc. of carbon tetrachloride was refluxed for 1 hour, then was cooled and 200 cc. of water were added thereto. The organic layer was separated by decanting and was washed with 200 cc. of water, dried over sodium sulfate, filtered and evaporated to dryness under reduced pressure. The yellowish white residue was crystallized from isopropyl alcohol and then from ethyl acetate to obtain 2.1 g. of 3-(2'-tetrahydropyranyl)-5-bromo-6-phenyl - 1,2,3,4 - tetrahydropyrimidine - 2,4-dione melting at 202–204° C.

*Analysis.*—$C_{15}H_{15}BrN_2O_3$: molecular weight=351.21. Calculated (percent): C, 51.30; H, 4.30; Br, 22.76; N, 7.97. Found (percent): C, 51.4; H, 4.1; Br, 22.8; N, 7.8.

As far as is known, this compound is not described in the literature.

HERBICIDAL ACTIVITY

Oats, clover, beets, wheat, corn flax, mustard, crysanthemum and foxtail grass were cultivated in a double bottom box (23 x 14 x 4 cm.) with wetting from underneath. 20 seeds of each species were placed in rows 3 cm. apart in one box and 4 repetitions were used for each concentration. The following culture conditions were observed: temperature of 20° C.±2°, about 60% humidity, fluorescent tube light (light of day+brilliant white) for 16 hours each day. The soil mixture used was 10 volumes of river sand, 10 volumes of arable soil and 2 volumes of peat.

For the pre-emergence test, the treatment was effected 24 hours after the seeding and the first wetting was effected by aspersion culture to entrain a part of the product to the level of the seeds. For the post emergence test, the treatment was effected after 21 days of growth with the above ground parts.

In both cases, the test compounds were applied in standard compositions with a micro-pulverizer at doses corresponding to 5, 2.5, 1.25 and 0.62 kg./ha. at a dilution corresponding to 560 liters per ha. The test controls were subjected to the same treatment without the active compounds. The final control was effected by weighing the plants 21 days after treatment in the pre-emergence test and 15 days after treatment in the post-emergence test and the results were expressed as percentage (P) of reduction of vegetation as follows:

$$P = \frac{\text{weight of control plants} - \text{weight of treated plants}}{\text{weight of control plants}} \times 100$$

The following tables report the results with 3-(2'-tetrahydropyranyl)-5-chloro - 6 - methyl - 1,2,3,4 - tetrahydropyrimidine-2,4-dione (Compound A) and the commercial preemergence herbicide, Atrazine, (2-chloro-4-ethylamino-6-isopropylamino-1,3,5-triazine) or the post emergence herbicide, Linuron [N'-(3,4-dichlorophenyl)-N-methoxy-N-methylurea.]

TABLE I.—PRE-EMERGENCE

| Kg. MA/ha | Compound A | | | | Atrazine | | | |
|---|---|---|---|---|---|---|---|---|
| | 5.0 | 2.5 | 1.25 | 0.62 | 5.0 | 2.5 | 1.25 | 0.62 |
| Oats | | 100 | 65.0 | 45.0 | | | | 100 |
| Beets | | | | 100 | | | | 100 |
| Wheat | 100 | 78.0 | 55.0 | 22.0 | 67.0 | 64.0 | 50.0 | 50.0 |
| Chrysanthemum | | | | 100 | | | | 100 |
| Flax | | 100 | 94.0 | 84.0 | | | | 100 |
| Corn | 65.0 | 45.0 | 17.0 | 11.0 | 0 | 0 | 0 | 0 |
| Mustard | | | | 100 | | | | 100 |
| Clover | | | | 100 | | | | 100 |
| Foxtail grass | | | | 100 | | | | 100 |

TABLE II.—POST EMERGENCE

| Kg. MA/ha | Compound A | | | | Linuron | | | |
|---|---|---|---|---|---|---|---|---|
| | 5.0 | 2.5 | 1.25 | 0.62 | 5.0 | 2.5 | 1.25 | 0.62 |
| Oats | | | | 100 | | | | 100 |
| Beets | | | | 100 | | | | 100 |
| Wheat | | | | 100 | | 100 | 55.0 | 60.0 |
| Chrysanthemum | | | | 100 | | | | 100 |
| Flax | | | | 100 | | | | 100 |
| Corn | | 30.0 | 31.0 | 20.0 | 15.0 | 65.0 | 30.0 | 20.0 | 5.0 |
| Mustard | | | | 100 | | | | 100 |
| Clover | | | | 100 | | | | 100 |
| Foxtail grass | | | | 100 | 85.0 | | 100 | 40.0 | 60.0 |

Tables III and IV show the results of pre- and post emergence tests with 3-(2'-tetrahydropyranyl)-5-bromo-6-methyl - 1,2,3,4 - tetrahydropyrimidine-2,4-dione (Compound B).

TABLE III.—PRE EMERGENCE

| Kg. MA/ha | 5 | 2.5 | 1.25 | 0.62 |
|---|---|---|---|---|
| Oats | 100 | 100 | 69 | 61 |
| Wheat | 67 | 64 | 63 | 20 |
| Corn | 0 | 0 | 0 | 0 |
| Foxtail grass | 100 | 100 | 100 | 88 |
| Beets | 100 | 100 | 100 | 100 |
| Chrysanthemum | 100 | 100 | 100 | 100 |
| Flax | 100 | 100 | 100 | 75 |
| Mustard | 100 | 100 | 100 | 100 |
| Clover | 100 | 100 | 100 | 44 |

TABLE IV.—POST EMERGENCE

| Kg. MA/ha | 5 | 2.5 | 1.25 | 0.62 |
|---|---|---|---|---|
| Oats | 100 | 100 | 100 | 100 |
| Wheat | 100 | 100 | 100 | 45 |
| Corn | 81 | 76 | 70 | 0 |
| Foxtail grass | 100 | 100 | 100 | 90 |
| Beets | 100 | 100 | 100 | 100 |
| Chrysanthemum | 100 | 100 | 100 | 100 |
| Flax | 100 | 100 | 100 | 100 |
| Mustard | 100 | 100 | 100 | 100 |
| Clover | 100 | 100 | 100 | 100 |

Various modifications of the compositions and method of the invention may be made without departing from the spirit or scope thereof and it is to be understood that the invention is to be limited only as defined in the appended claims.

We claim:

1. A compound of the formula

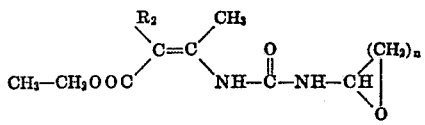

wherein $R_2$ is selected from the group consisting of hydrogen, methyl and chlorine and $n$ is 4.

2. A compound of claim 1 wherein $R_2$ is chlorine and $n$ is 4.

3. A compound of claim 1 wherein $R_2$ is methyl and $n$ is 4.

4. A compound of claim 1 wherein $R_2$ is hydrogen and $n$ is 4.

5. A compound of the formula

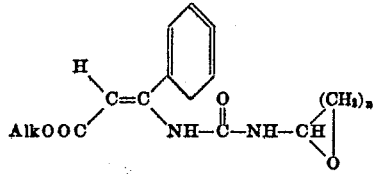

wherein Alk is alkyl of 1 to 7 carbon atoms and $n$ is 4.

6. A compound of claim 5 wherein Alk is ethyl and $n$ is 4.

References Cited
UNITED STATES PATENTS 3,658,819   4/1972   Bertin et al. _____ 260—34.58

NORMA S. MILESTONE, Primary Examiner